United States Patent [19]

French et al.

[11] Patent Number: 5,507,951
[45] Date of Patent: Apr. 16, 1996

[54] METHOD FOR TREATING HEXAMINE WASTE WATER

[75] Inventors: J. Allen French; David W. Swart; William E. Oakley, all of Wilmington, N.C.

[73] Assignee: Wright Chemical Corporation, Reigelwood, N.C.

[21] Appl. No.: 200,222

[22] Filed: Feb. 23, 1994

[51] Int. Cl.$^6$ .................................................. C02F 9/00
[52] U.S. Cl. ........................ 210/631; 210/664; 210/668; 210/669; 210/670; 210/748; 210/759
[58] Field of Search .................................. 210/631, 663, 210/664, 668, 669, 670, 748, 759, 908

[56] References Cited

U.S. PATENT DOCUMENTS

| | | | |
|---|---|---|---|
| 4,147,623 | 4/1979 | Koff et al. | 210/31 R |
| 4,338,196 | 7/1982 | Mayerle | 210/908 |
| 4,999,112 | 3/1991 | Dobuler et al. | 210/656 |
| 5,015,560 | 5/1991 | Koboshi et al. | 430/398 |
| 5,039,424 | 8/1991 | Mitarai et al. | 210/669 |
| 5,062,957 | 11/1991 | Berreby | 210/611 |

*Primary Examiner*—Ivars Cintins
*Attorney, Agent, or Firm*—Bell, Seltzer, Park & Gibson

[57] ABSTRACT

The present invention provides a method for treating hexamine waste water. The method includes subjecting the waste water to conditions sufficient to remove volatile constituents, passing the waste water through a cation exchange resin capable of absorbing cations, and optionally either subjecting the waste water to a bacteria culture capable of consuming formaldehyde in the presence of an organic nutrient for the bacteria or subjecting the waste water to ultraviolet light in the presence of an oxidizing agent. The method may include both optional method steps, but must include at least one. The method also includes regenerating the cation exchange resin to remove the absorbed cations and reform the cation exchange resin. The present invention also provides an apparatus for treating hexamine waste water.

18 Claims, 1 Drawing Sheet

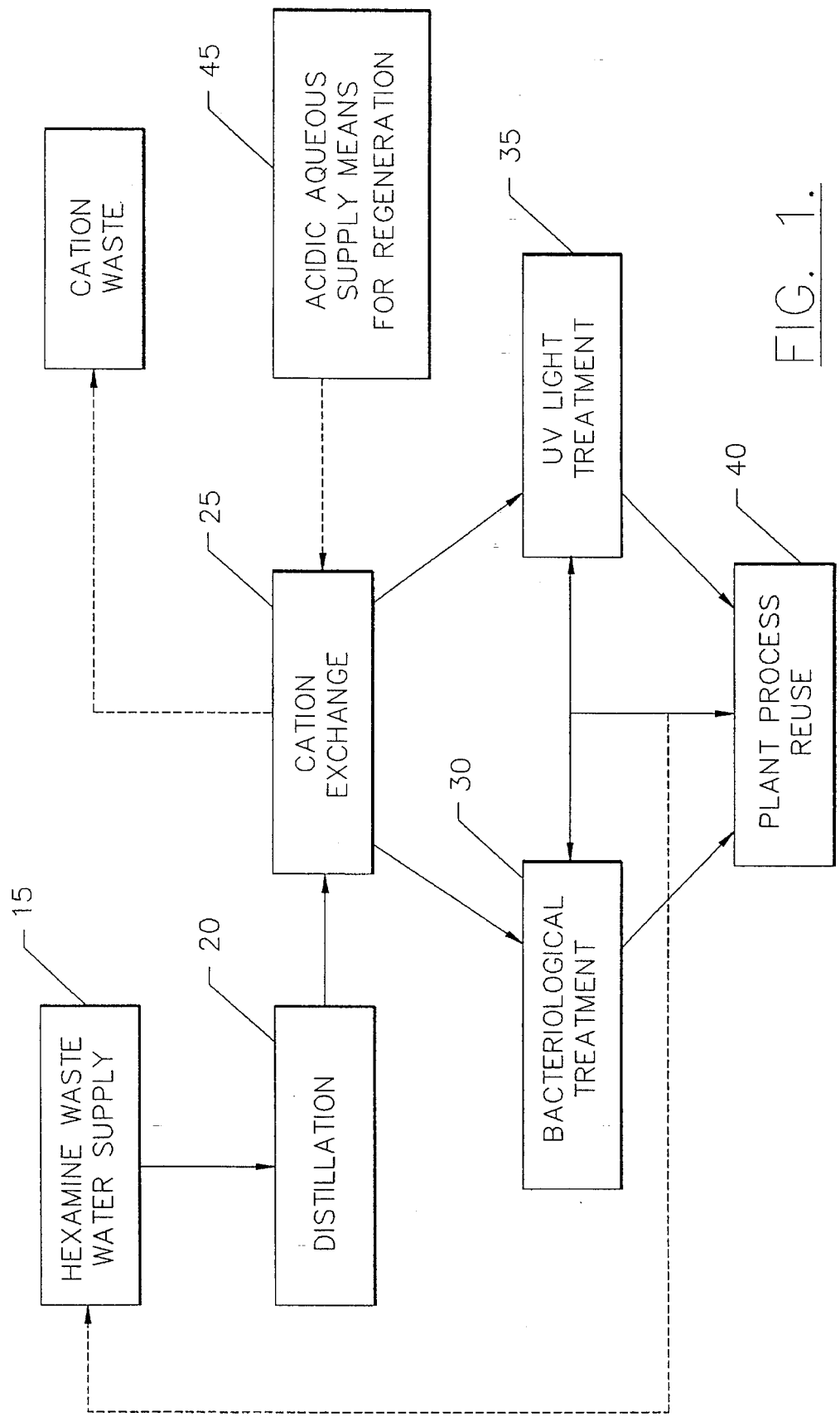

5,507,951

METHOD FOR TREATING HEXAMINE WASTE WATER

FIELD OF THE INVENTION

The present invention relates to methods and apparatus for treating waste water resulting from the production of hexamethylenetetramine.

BACKGROUND OF THE INVENTION

Hexamethylenetetramine $((CH_2)_6N_4)$, otherwise known as hexamine has multiple uses. For example, it is useful in curing phenolfomaldehyde and resorcinolformaldehyde resins, as a rubber to textile adhesive, as a protein modifier, as an ingredient of high explosive cyclonite, as fuel tablets, as a rubber accelerator, as a fungicide, as a corrosion inhibitor, as a shrink-proofing agent for textiles, and as an antibacterial agent. In addition, hexamine also has applications in organic synthesis and pharmaceutical compositions.

Hexamine is produced by reacting ammonia and formaldehyde. The reaction produces hexamine as a precipitate in water. The hexamine precipitate is then removed from solution and sold in crystalline form. Typically, the water is extracted by vacuum evaporation, condensed and collected, forming hexamine waste water. This waste water typically contains residual amounts of the reactants (i.e., ammonia and formaldehyde) as well as residual amounts of hexamine dissolved in solution, and must be chemically treated to remove these organic wastes before it can be reused internally.

Effective treatment of hexamine waste water has been a problem for hexamine producers. Currently, there is no known method of treating hexamine waste water to remove all organic waste constituents. Conventional organic waste treatments are ineffective for removing hexamine from solution. For example, it is known in the industry that hexamine is resistant to biological degradation, and therefore biological treatment methods are typically ineffective in the treatment of hexamine waste water. Moreover, the presence of hexamine in solution typically inhibits the removal of the other organic wastes by known methods.

For all of the forgoing reasons, it would be highly desirable to provide a method and apparatus for effectively and efficiently treating hexamine waste water.

SUMMARY OF THE INVENTION

To this end, the present invention provides a method and apparatus for treating hexamine waste water. The method comprises subjecting the waste water to conditions sufficient to remove volatile constituents, passing the waste water through a cation exchange resin capable of absorbing cations, subjecting the waste water either to a bacteria culture capable of consuming formaldehyde or to ultraviolet light in the presence of an oxidizing agent, or to both. Preferably, the method further comprises regenerating the cation exchange resin to remove the absorbed cations and to reform the cation exchange resin.

The present invention also provides an apparatus for treating hexamine waste water. The apparatus comprises: a waste fluid supply means; means for removing volatile constituents (e.g., a distillation column); cation exchange means for absorbing cations from the hexamine waste water, the means including a cation exchange resin; a bacteriological treatment means, including a bacteria culture, for consuming formaldehyde; and/or irradiation means for irradiating the hexamine waste water with ultraviolet light in the presence of an oxidizing agent. Preferably, the apparatus further includes acidic aqueous solution supply means for regenerating the cation exchange resin to remove the absorbed cations and reform the cation exchange resin.

As used herein, the term "hexamine waste water" or simply "waste water" refers to the water formed as a by-product in the production of hexamine. The waste water typically contains residual amounts of hexamine, ammonia, formaldehyde, formic acid and methanol. As used herein, the term "volatile constituent" means a constituent of hexamine waste water which has a boiling point which is lower than the boiling point of water,

BRIEF DESCRIPTION OF THE DRAWINGS

FIG. 1 is a schematic and diagrammatic representation of an apparatus in accordance with the present invention.

DETAILED DESCRIPTION OF THE INVENTION

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Referring to FIG. 1, the apparatus for treating hexamine waste water of the present invention is designated by the reference number 10. The apparatus 10 comprises a hexamine waste water supply means 15; a distillation column 20, or other means for removing volatile constituents; cation exchange means 25 for absorbing cations from the hexamine waste water, the means including a cation exchange resin; a bacteriological treatment means 30, including a bacteria culture for consuming formaldehyde; and/or irradiation means 35 for irradiating the hexamine waste water with ultraviolet light in the presence of an oxidizing agent. The water produced by the apparatus 10 is suitable for plant process reuse 40. Preferably, the apparatus further comprises means for regenerating 45 the cation exchange resin to remove the absorbed cations and reform the cation exchange resin.

The hexamine waste water supply means 15 supplies waste water from the hexamine manufacturing plant to the hexamine waste water treatment apparatus 10. Typically, the hexamine waste water contains residual amounts of ammonia, formaldehyde, hexamine, methanol and formic acid. The supply means is connected to the distillation column 20 wherein the hexamine waste water is subjected to conditions sufficient to remove volatile constituents. Typically, the volatile constituents in hexamine waste water include ammonia and methanol. The volatile constituents may be removed by any suitable means known to those skilled in the art. For example, if volatile constituents are removed by distillation this is typically conducted at about 98° C. to 101° C. for about 15 to 25 minutes.

It may be desirable to analyze the concentration of the organic wastes present at various stages of treatment. The waste water may be analyzed using any suitable means (not shown) for determining the concentration of organic wastes present. Suitable means of determining the concentration of the organic waste constituents can include gas chromatography, high performance liquid chromatography (HPLC)

and specific ion electrode analysis, each alone or in combination. Preferably, methanol and hexamine concentrations are analyzed using gas chromatography; formaldehyde and formic acid concentrations are analyzed using HPLC; and ammonia concentration is analyzed using a specific ion electrode.

The distillation means 20 is connected to the cation exchange means 25 for absorbing cations from the hexamine waste water. The cation exchange means 25 includes a cation exchange resin. The waste water is passed through the cation exchange means 25, wherein cations are absorbed. Preferably, the volatile constituents are removed prior to treatment with the cation exchange means 25. The cation exchange means 25 is capable of absorbing a variety of cations. Since hexamine in water acts as a cation, a suitable cation exchange means 25 and the resin therein will extract hexamine among other cationic species, and replace them with anionic species. The volatile constituents are preferably removed prior to treatment with the cation exchange means 25 to prevent any cationic species of these constituents from absorbing thereon. A preferred, commercially available cation exchange resin comprises a polystyrenic copolymer matrix having sulfonate groups. An exemplary polystyrenic copolymer cation exchange resin comprises a copolymer of styrene and divinylbenzene having sulfonate groups. A preferred cation exchange resin is C-100H™ obtainable from Purolite, Bala Cynwyd, Pa.

The waste water is typically passed through the cation exchange means 25 at a rate in the range of about 1–50 gpm/ft$^3$. The optimum flow rate can be readily determined by one skilled in the art. The efficiency of the cation exchange resin at a particular flow rate can be evaluated by analyzing the concentration of hexamine remaining in the hexamine waste water after cation exchange means 25 treatment, and comparing that concentration to the concentration of hexamine in the hexamine waste water before exposure to the resin of the cation exchange means 25. By using this method of evaluating efficiency, one skilled in the art can determine the optimum flow rate without undue experimentation. After the waste water has been subjected to the cationic exchange resin it may optionally be analyzed as described above.

Ideally, the concentration of residual hexamine in the hexamine waste water after treatment with the cation exchange resin will be below about 10 ppm. It may be desirable to repeat the cation exchange resin treatment until the desired hexamine concentration is achieved; as the presence of hexamine in the waste water may inhibit the removal of the remaining constituents by bacteriological treatment.

The waste water is conveyed from cation exchange means 25 to either bacteriological treatment means 30 or irradiation means 35. In the case of the former, bacteriological treatment comprises subjecting the hexamine waste water to a bacteria culture capable of consuming formaldehyde. The bacteria culture capable of consuming formaldehyde is an undefined bacteria culture. An undefined bacteria culture is a bacteria culture containing a variety of genus and species which is obtained from the sludge of a local water treatment plant.

The bacteriological treatment is conducted in a reactor preferably equipped with PVC saddles, and packed to a depth of several inches, with the bacteria culture. Preferably, prior to initiating bacteriological treatment, a portion of hexamine waste water is diluted and added along with activated sludge from the local waste water treatment plant to acclimate the reactor to the waste water stream. Typically acclimation takes place over the course of about a week.

The waste water is preferably fed to the reactor over the course of several days at a flow rate of about 1 to 40 gallons/min. Preferably the flow rate is about 30 gallons/min. Typically, the waste water is subjected to the bacteria for about 4 to 13 hours. Preferably, the hexamine waste water is subjected to the bacteria for about 8 to 9 hours. One skilled in the art will appreciate that the optimum exposure to the bacteria will depend on the concentration of formaldehyde in the waste water, the flow rate, and other factors, and that the optimum exposure period can be determined without undue experimentation by periodically analyzing the hexamine concentration according to the method described above.

Bacteriological treatment takes place in the presence of a nutrient for the bacteria and sufficient oxygen. The nutrient and oxygen are required for the survival of the bacteria. A preferred nutrient comprises an aqueous solution of various salts including sodium nitrate, magnesium sulfate, calcium chloride, phosphorous sulfate, sodium chloride, di- and monopotassium phosphate, yeast extract and Higgens 500X trace metals. A preferred oxygen concentration is at least about 4 ppm.

In order to reuse the hexamine waste water internally for further plant processes, the treated hexamine waste water should achieve a Biological Oxygen Demand (BOD) of not more than about 50 ppm. Typically, the treated hexamine waste water will contain not more than about 5 ppm of formaldehyde, formic acid, or methanol, and not more than about 10 ppm of hexamine or ammonia. If the desired concentration of organic wastes is not achieved, the bacteriological treatment may be repeated. The water obtained from the foregoing treatment method is suitable for plant process reuse 40. However, it may be desirous for some plant processes to further purify the treated waste water by further lowering the concentrations of residual organic constituents.

The treated hexamine waste water may optionally be further purified by subjecting the hexamine waste water to irradiation means 35 such as a source of ultraviolet light in the presence of an oxidizing agent, in accordance with methods known to those skilled in the art. According to this embodiment, the hexamine waste water is conveyed from the bacteriological treatment means 30 to the irradiation means 35 for irradiating the waste water with ultraviolet light in the presence of an oxidizing agent (also referred to as ultraviolet light treatment). The ultraviolet light has a wavelength sufficient to be absorbed by formaldehyde. The ultraviolet light treatment 35 is conducted in the presence of a suitable oxidizing agent, which assists in the decomposition of the organic waste constituents. A preferred oxidizing agent is hydrogen peroxide.

In an alternate embodiment, the hexamine waste water is conveyed from the outflow of the cation exchange means 25 directly to the irradiation means 35 for irradiating the waste water with ultraviolet light in the presence of an oxidizing agent. In this embodiment, the waste water is preferably diluted with tap water to reduce the concentrations of the organic wastes present prior to ultraviolet light treatment 35. The method of irradiating the waste water with ultraviolet light is carried out according to the method described above. The water obtained from the foregoing method is suitable for plant process reuse 40. Optionally, the waste water may be further purified by subjecting the waste water to bacteriological treatment means 30 according to the method set forth above.

The present invention preferably further comprises acidic aqueous solution supply means 45 for regenerating the cation exchange resin to remove the absorbed cations and reform the cation exchange resin. After the waste water has been passed through the cation exchange means 25, the cations from the waste water are absorbed onto the cation exchange resin. The absorbed cations remain on the resin until they are replaced by anions during the cation exchange resin regeneration. Eventually the cations absorbed on the resin will saturate the resin, and render it ineffective for the further removal of cations from the hexamine waste water. Once the cation exchange resin is saturated with cations from the hexamine waste water, it must be regenerated to remove the absorbed cations, and to reform the cation exchange resin. The resin is regenerated by contacting an acidic aqueous solution to the resin having cations absorbed thereon. The acidic aqueous solution supply means 45 supplies the solution which removes the hexamine and other cations and replaces them with anions. This process renders the cation exchange resin operational for further hexamine waste water treatment. The cation waste solution containing the removed cations is then incinerated or otherwise destroyed. Preferably the acidic aqueous solution is a solution of sulfuric acid, which replaces the cations with sulfonate anions. More preferably, the aqueous solution is a 10 percent solution of sulfuric acid in water.

After the resin has been regenerated, the foregoing method may be repeated to provide a continuous hexamine waste water treatment method. The treated water produce in accordance with the present invention is suitable for plant process reuse.

In operation, the hexamine waste water is carried from the hexamine waste water supply means 15 to the distillation means 20 wherein it is subjected to conditions sufficient to remove volatile constituents. The waste water having volatile constituents removed it then conveyed to and passed through the cation exchange means 25 wherein the cation exchange resin absorbs cations from the waste water. Thereafter, the hexamine waste water may be conveyed to the bacteriological treatment means 30 or the irradiation means 35, or both. The treated waste water produced by the hexamine waste water treatment apparatus 10 is suitable for reuse in plant processes. It is necessary to periodically regenerate the cation exchange means 20 to remove the cations absorbed thereon and reform the cation exchange resin. Typically, the cation exchange means 20 is regenerated by contacting the resin having cations absorbed thereon with an aqueous acidic solution from the aqueous acidic solution supply means 45. The aqueous acidic solution removes the cations absorbed on the resin and substitutes anions therefor. The cation exchange means 20, being regenerated is then available for the treatment of additional hexamine waste water, and the foregoing steps can be repeated to create a continuous hexamine waste water treatment system.

The following examples are provided to illustrate the present invention, and should not be construed as limiting thereof. In these examples, gal. means gallons; ppm means parts per million; HPLC means High Performance Liquid Chromatography; $ft^3$ means cubic feet; in. means inches; min. means minutes; l means liters; and ml means milliliters.

EXAMPLE 1

A sample of 110 gallons of waste water (pH 8.8) generated in the production of hexamine is obtained by vacuum distillation of a concentrated solution of hexamine. Initial analysis indicates that the waste water contained traces of hexamine, formaldehyde, methanol and ammonia-nitrogen. An analysis of hexamine and methanol in the hexamine waste water is conducted using a 14A Gas Chromatograph obtained from Schimadzu, Kyoto, Japan, fitted with a TENAX TA™ column obtained from Alltech, Avondale, Pa. The analysis indicates the presence of 371 ppm of hexamine and 2,530 ppm of methanol in solution. The concentrations of formaldehyde and formic acid are analyzed using an LC 600 HPLC also obtained from Schimadzu and fitted with a ADSORBOSPHERE C-18™ also obtained from Alltech. Analysis indicates that formaldehyde is present in the amount of 225 ppm, and that no detectable trace of formic acid is present in solution. Analysis with a Specific Ion Electrode indicates the presence of 95 ppm of Ammonia-Nitrogen.

After analysis, the hexamine waste water is heated to about 100° C. and distilled to remove and recover the volatile constituents. After distillation, the concentration of organic waste constituents is again analyzed according to the methods described above. The following results are obtained:

| Organic Waste Constituent | ppm |
|---|---|
| Hexamine | 375 |
| Formaldehyde | 230 |
| Methanol | 282 |
| Formic Acid | None Detected |
| Ammonia Nitrogen | 40 |

Subsequent to the removal of volatile constituents and analysis, the hexamine waste water is pumped through a deionization column containing 1.5 $ft^3$ of C-100H™ cation exchange resin obtained from Purolite. The waste water leaving the cation exchange resin column is analyzed for organic waste constituent concentration as described above. The following results are obtained:

| Organic Waste Constituent | ppm |
|---|---|
| Hexamine | None Detected |
| Formaldehyde | 590 |
| Methanol | 287 |
| Formic Acid | None Detected |
| Ammonia-N | 13 |

Subsequent to the analysis, the waste water is fed to a bioreactor over the course of thirty three days. The bioreactor contained one-inch Norton Intalox PVC saddles and was obtained from Biotrol Inc., Eden Prairie, Minn., The bioreactor is packed to a depth of 12 in. (2.5 l). Oxygen, in the form of air, is supplied to the bioreactor via a fine bubble airstone secured to the bottom of the reactor. The bioreactor is operated in a submerged aerobic mode. To begin acclimation the waste water is diluted with tap water and added along with activated sludge from the Whiteville, North Carolina Municipal Waste Water Treatment Facility. After a week of daily batch feedings to acclimate the bioreactor to the waste water stream, the bioreactor is run on single-pass flow at various flow rates to determine the optimum flow rate. The effluent from the bioreactor is analyzed five times per week for the target removal of formaldehyde and methanol. At a flow rate of 5 ml/min and a retention time of 8.1 hours, both formaldehyde and methanol concentrations were reduced in excess of 95 percent of the concentration of those wastes after treatment with the cation exchange resin.

The water resulting is clean and ready for plant process reuse; the organic waste constituents having been effectively and efficiently removed therefrom.

EXAMPLE 2

A sample of 55 gallons of waste water generated in the production of hexamine is obtained by vacuum distillation of a concentrated solution of hexamine. Initial analysis, according to methods described in Example 1 above, indicates that the waste water contained traces of hexamine, formaldehyde, methanol and ammonia-nitrogen.

The hexamine waste water is heated to 100° C. and distilled to remove and recover the volatile constituents. Subsequently, the hexamine waste water is pumped through a deionization column containing 1.5 ft$^3$ of C-100H™ cation exchange resin obtained from Purolite. The waste water leaving the cation exchange resin column is then diluted with tap water to the following organic waste constituent concentrations:

| Organic Waste Constituent | ppm |
| --- | --- |
| Hexamine | None Detected |
| Formaldehyde | 233 |
| Methanol | 210 |
| Formic Acid | 26.4 |

Thereafter, 29 l of hexamine waste water is irradiated in a 1 KW bench UV Peroxide RAYOX™ reactor obtainable from Solar Chem. Inc. The hexamine waste water is analyzed periodically during the course of UV treatment, and the following results were obtained:

Analysis demonstrated that the concentration of organic wastes in a sample exposed to uv treatment for 30 minutes in the presence of 2,000 ppm of hydrogen peroxide, was analyzed, contained no detectable quantities of methanol or formic acid and less than 1 ppm of formaldehyde. Both levels of methanol and formic acid were reduced to undetectable levels. Formaldehyde concentration was reduced to less than 1 ppm.

The results indicate that irradiation with ultraviolet light in the presence of an oxidizing agent effectively and efficiently reduces the concentration of organic wastes in the hexamine waste water.

The foregoing is illustrative of the present invention and is not to be construed as limiting thereof. The invention is defined by the following claims, with equivalents of the claims to be included therein.

That which is claimed is:

1. A method of treating hexamine waste water, said method comprising the steps of:
   (a) subjecting the waste water to conditions sufficient to remove volatile constituents;
   (b) passing the waste water through a cation exchange resin capable of absorbing cations; and
   (c) subjecting the waste water to a bacteria culture capable of consuming formaldehyde in the presence of an organic nutrient for the bacteria.

2. The method according to claim 1, further comprising step (d) of subjecting the waste water to ultraviolet light in the presence of an oxidizing agent.

3. A method according to claim 2, wherein the ultraviolet light has a wavelength sufficient to be absorbed by formaldehyde.

4. A method according to claim 2, wherein the oxidizing agent is hydrogen peroxide.

5. A method according to claim 2 further comprising step (e) of regenerating the cation exchange resin to remove the absorbed cations and reform the cation exchange resin, by contacting the resin containing absorbed cations with an acidic aqueous solution, and repeating steps (a) through (c) or steps (a) through (d).

6. A method according to claim 5, wherein the acidic aqueous solution comprises sulfuric acid.

7. A method according to claim 2, wherein said conditions sufficient to remove volatile constituents of step (a) comprise distillation.

8. A method according to claim 2, wherein the cation exchange resin of step (b) comprises a polystyrenic copolymer matrix having sulfonate groups.

9. A method according to claim 8, wherein the cation exchange resin of step (b) comprises a copolymer of styrene and divinylbenzene having sulfonate groups.

10. A method according to claim 2, wherein the bacteria culture capable of consuming formaldehyde of step (c) comprises an undefined bacteria culture obtained from the sludge of a water treatment plant.

11. A method of treating hexamine waste water, said method comprising the steps of:
    (a) subjecting the waste water to conditions sufficient to remove volatile constituents;
    (b) passing the waste water through a cation exchange resin capable of absorbing cations; and
    (c) subjecting the waste water to ultraviolet light in the presence of an oxidizing agent.

12. A method according to claim 11 further comprising step (d) of regenerating the cation exchange resin to remove the absorbed cations and reform the cation exchange resin, by contacting the resin containing absorbed cations with an acidic aqueous solution, and repeating steps (a) through (c).

13. A method according to claim 12, wherein the acidic aqueous solution comprises sulfuric acid.

14. A method according to claim 12, wherein said conditions sufficient to remove volatile constituents of step (a) comprise distillation.

15. A method according to claim 12, wherein the cation exchange resin of step (b) comprises a polystyrenic copolymer matrix having sulfonate groups.

16. A method according to claim 12, wherein the cation exchange resin of step (b) comprises a copolymer of styrene and divinylbenzene having sulfonate groups.

17. A method according to claim 12, wherein the ultraviolet light of step (c) has a wavelength sufficient to be absorbed by formaldehyde.

18. A method according to claim 12, wherein the oxidizing agent of step (c) is hydrogen peroxide.

\* \* \* \* \*